United States Patent [19]

Yasuge

[11] Patent Number: 4,999,475
[45] Date of Patent: Mar. 12, 1991

[54] DETECTING SYSTEM OF ELECTRODE TIPS FOR A SPOT WELDER

[75] Inventor: Katsumi Yasuge, Ashikaga, Japan

[73] Assignee: Fuji Jukogyo Kabushiki Kaisha, Tokyo, Japan

[21] Appl. No.: 497,503

[22] Filed: Mar. 22, 1990

[30] Foreign Application Priority Data

Apr. 7, 1989 [JP] Japan ................. 1-40531[U]

[51] Int. Cl.$^5$ ............................................. B23K 11/25
[52] U.S. Cl. .................................. 219/86.41; 219/91.1
[58] Field of Search ............... 219/86.24, 86.25, 86.41, 219/91.1

[56] References Cited

U.S. PATENT DOCUMENTS 4,912,294  3/1990  Tsujii .............................. 219/86.24

FOREIGN PATENT DOCUMENTS 61-107482  7/1986  Japan.

*Primary Examiner*—Clifford C. Shaw
*Attorney, Agent, or Firm*—Martin A. Farber

[57] ABSTRACT

A detecting system for a spot welder having a pair of electrodes attached to a pair of arms is disclosed. A limit detecting device has a pair of axially slidable detecting rods spaced at a predetermined distance corresponding to the distance between the electrodes, and a pair of switches each of which is operated by axial movement of the corresponding detecting rod. The electrodes are moved to the detecting rods to axially move the detecting rods to operate the switches respectively. When the switch is not operated by the electrodes, working limit of the electrode is informed.

2 Claims, 3 Drawing Sheets

DETECTING SYSTEM OF ELECTRODE TIPS FOR A SPOT WELDER

BACKGROUND OF THE INVENTION

The present invention relates to a system for detecting working limit of electrode tips of a spot welder.

Since the electrode tip of the spot welder wears to be deformed as it is used, the electrode must be periodically reformed into a desired shape by grinding. When a dimension of the electrode reaches a predetermined limit value, the electrode is replaced with a new electrode.

However, since the dimension of the electrode is visually checked by an operator, the electrode may be used over the working limit. As a result, problems such as defective welding arise.

In order to resolve the problem, it has been proposed to provide a warning apparatus for producing a command signal to change the electrode or to stop welding operation when the number of the spot welding stroke reaches a predetermined number.

However, in such a system, a dotting (spotting procedure) without electricity and a test dotting are counted as the number of spot welding stroke. Consequently, the command for changing the electrode tip or stopping the welding operation is produced at a time earlier than a proper changing time, which means a waste of the electrode.

FIG. 4 shows another conventional device for detecting the working limit of the electrode tip disclosed in Japanese Utility Model Application Laid-Open No. 61-107482. The device has a socket 11 in which a used electrode tip 12 to be detected is inserted, a stopper 13 provided on the end of the socket 11 for stopping the inserted electrode tip 12, a detecting rod 14 slidably mounted in the wall of the socket 11 and laterally projected to the inside of the socket, and position detecting means 15 arranged to be operated by the detecting rod 14.

When the electrode tip 12 is inserted into the socket 11 and touched to the stopper 13, the detecting rod 14 is moved by the electrode tip 12. A moving distance of the detecting rod 14 is dependent on a deformed shape of the electrode tip. The position detecting means 15 produces a signal in accordance with the moving distance. Thus, working limit of the electrode tip 12 is determined.

However, such a device is complicated in construction and hence manufacturing cost increases. Further, the device has no possibility to perform the detection automatically during the welding operation.

SUMMARY OF THE INVENTION

An object of the present invention is to provide a working limit detecting system which may stop welding operation at a proper time, thereby preventing an over working or a waste of electrode tips.

Other object of the invention is to provide a system which is simple in construction and manufactured at a low cost.

Another object of the invention is to provide a system which automatically performs the detection during the welding operation.

According to the present invention, there is provided a detecting system for a spot welder having a pair of electrode tips attached to a pair of arms respectively, comprising a limit detecting device having a pair of axially slidable detecting rods spaced at a predetermined distance corresponding to the distance between the electrode tips, and a pair of switches each of which is operated by axial movement of the corresponding detecting rods, means for moving the electrodes to the detecting rods so as to axially move the detecting rods to operate the switches respectively, means for determining whether each switch is operated or not, indicator means responsive to non-operation of the switch for indicating working limit of the electrode.

The other objects and features of this invention will become understood from the following description with reference to the accompanying drawings.

DETAILED DESCRIPTION OF THE PREFERRED EMBODIMENT

Figure 1:
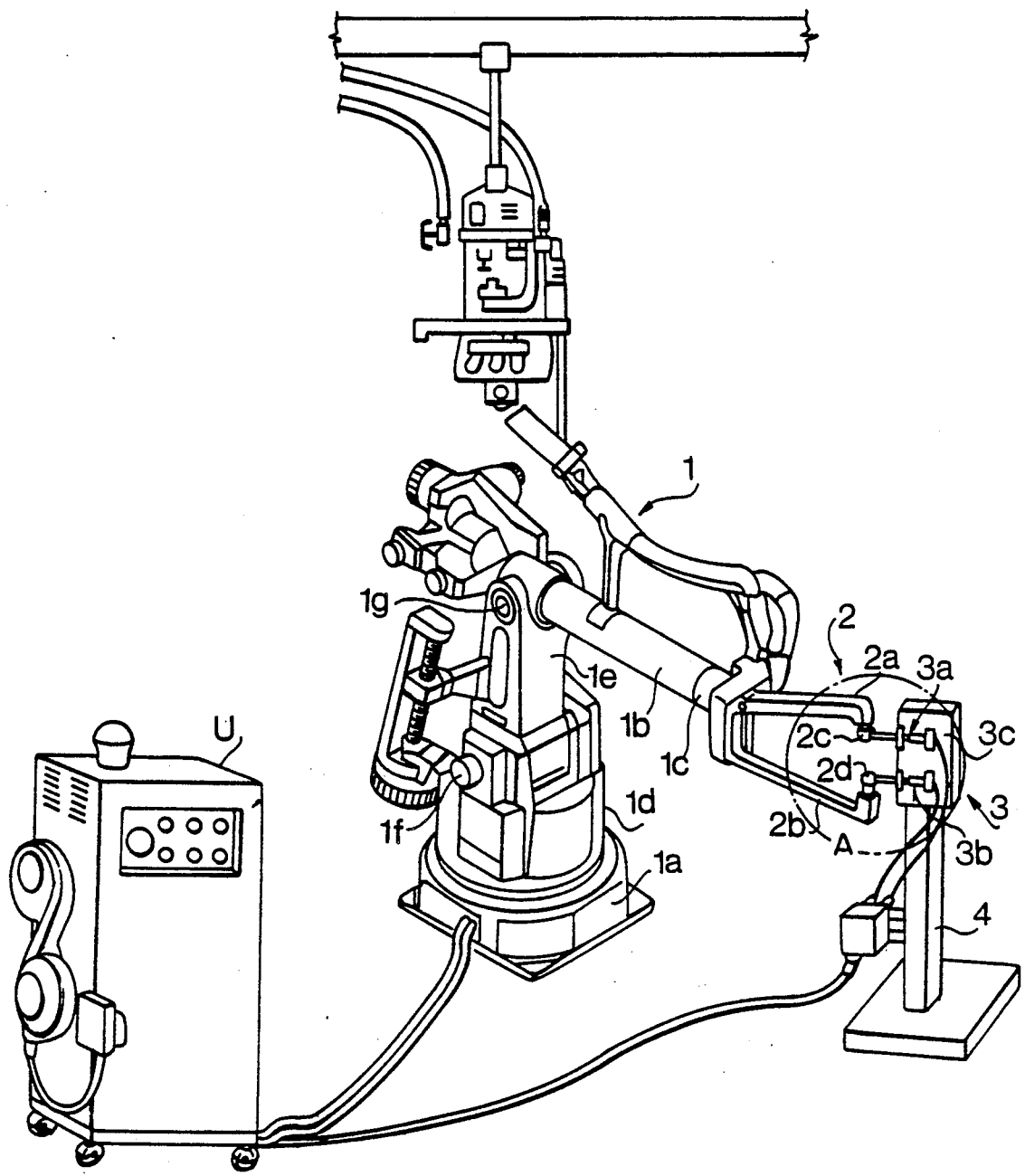
FIG. 1 is a schematic perspective view showing a system according to the present invention.

Referring to FIG. 1 showing a system according to the present invention, a spot welder comprises a welding robot 1 and a welding gun 2. The welding robot 1 has a swivel 1d rotatably mounted on a base 1a, a column 1e rotatably mounted on a horizontal shaft 1f, and a swing arm 1b pivotally mounted on a shaft 1g. The welding gun 2 is mounted on the end of the arm 1b through a rotary portion 1c which is rotatable about the axis of the arm 1b. The welding gun 2 comprises an upper arm 2a and a lower arm 2b disposed at a predetermined distance. An electrode tip 2c is detachably attached to the end of the upper arm 2a in the downward direction. An electrode tip 2d is detachably attached to the lower arm 2a in the upward direction corresponding to the electrode tip 2c. In spot welding, the arms 2a and 2b are controlled by a control unit U to move to a desired position in the space of the three dimensions, so that a pair of metal plates to be welded are disposed between the electrode tips 2c and 2d and welded in the conventional way.

A limit detecting device 3 is located in a proper position near the spot welder. The device 3 comprises a base plate 3c mounted on a stand 4 and a pair of detecting means 3a and 3b provided on the base plate 3c for detecting the working limit of the electrode tips 2c and 2d, respectively. The detecting means 3a and 3b are positioned at a predetermined distance in the vertical direction, corresponding to the electrode tips 2c and 2d.

Figure 2:
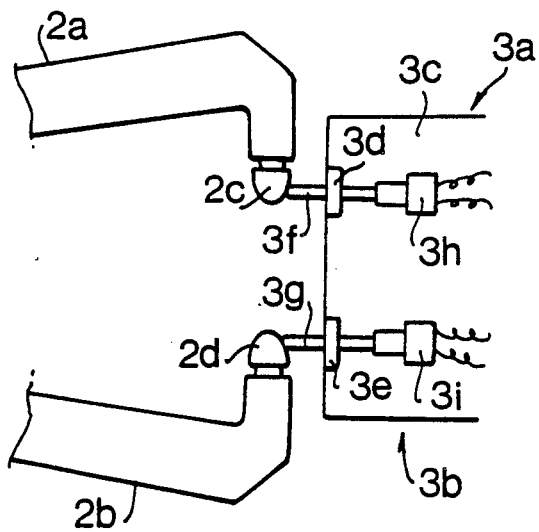
FIG. 2 is an enlarged side view of a main part of the system partly shown in a circle A of FIG. 1.

Referring to FIG. 2, the detecting means 3a and 3b comprise a pair of supporting member 3d and 3e secured to the portion of the base plate 3c, detecting rods 3f and 3g axially slidably mounted in the supporting members 3d and 3e and laterally projected from the base plate 3c, and limit switches 3h and 3i. As shown in FIG. 3b, the detecting rod 3f(3g) is outwardly urged by a spring 3j.

Describing the operation of the system, when the welding gun 2 of the welding robot 1 finishes a predetermined number of spot weldings strokes, the robot 1 is moved along a predetermined track to the limit detecting device 3 in accordance with a program stored in the control unit U. The arms 2a and 2b of the welding gun 2 are located at predetermined angular positions so that the electrode tips 2c and 2d are positioned at a predetermined space. When the arms 2a and 2b correspond to positions of the detecting means 3a and 3b (Steps S1 and S2 of FIG. 5), the arms are moved to the detecting means 3a and 3b so that the electrode tips 2c and 2d are abutted on the detecting rods 3f and 3g, respectively.

Figure 3A:
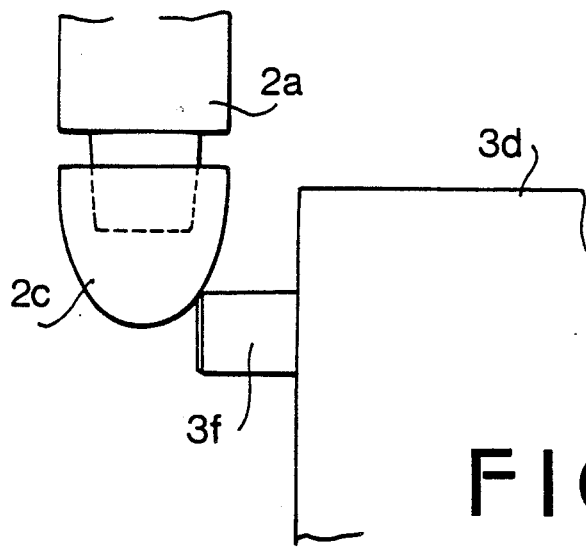
FIGS. 3a and 3b are enlarged explanatory views showing a detecting operation of the system.
Figure 3B:
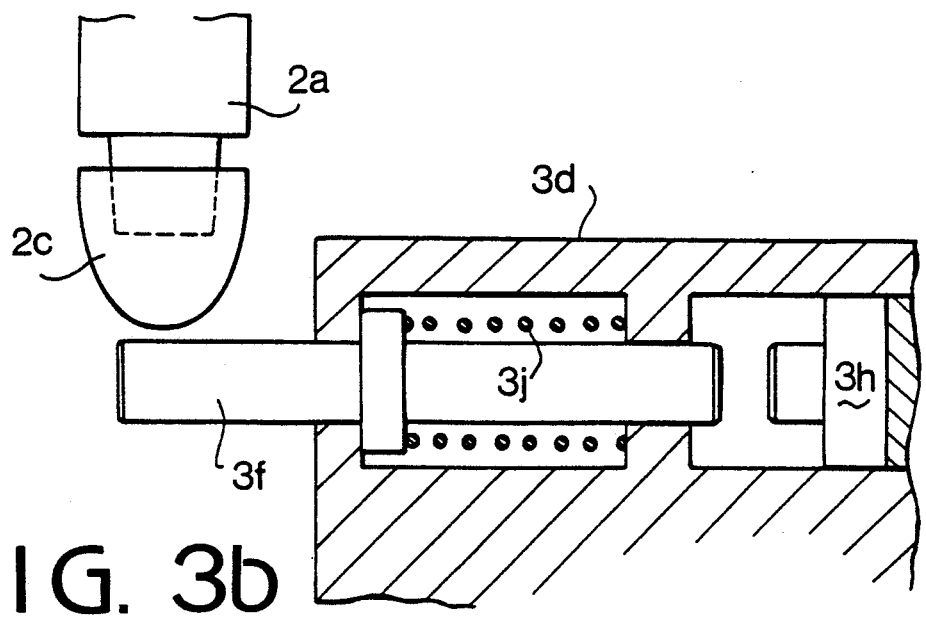
Figure 4:
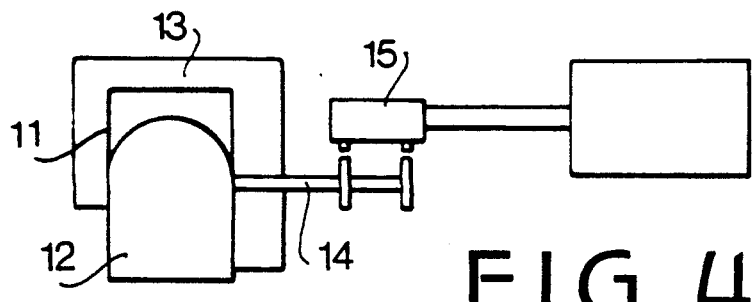
FIG. 4 is an enlarged schematic view showing a conventional system.

If wear of the electrode tip 2c is still acceptable, the electrode tip 2c engages the detecting rod 3f as shown in FIG. 3a. Thus, the detecting rod 3f is retracted by the electrode tip 2c so that the limit switch 3h operates (step S3). Both a normally open switch and a normally close switch is usable as the limit switch 3h. The control unit U detects that the electrode tip 2c is available responsive to condition change of the limit switch 3h.

If the wear of the electrode tip 2c exceeds the limit, the electrode tip 2c does not engage with the detecting rod 3f as shown in FIG. 3b. Thus, the detecting rod 3f is not moved so that the limit switch 3h detects that the electrode tip 2c is out of contact with the detecting rod 3f. The control unit produces a limit signal for stopping the spot welding by the welding robot and for alarming by an alarm device such as a buzzer (steps S5 and S6). The electrode tip 2c reaching the working limit is changed to the new one.

Figure 5:
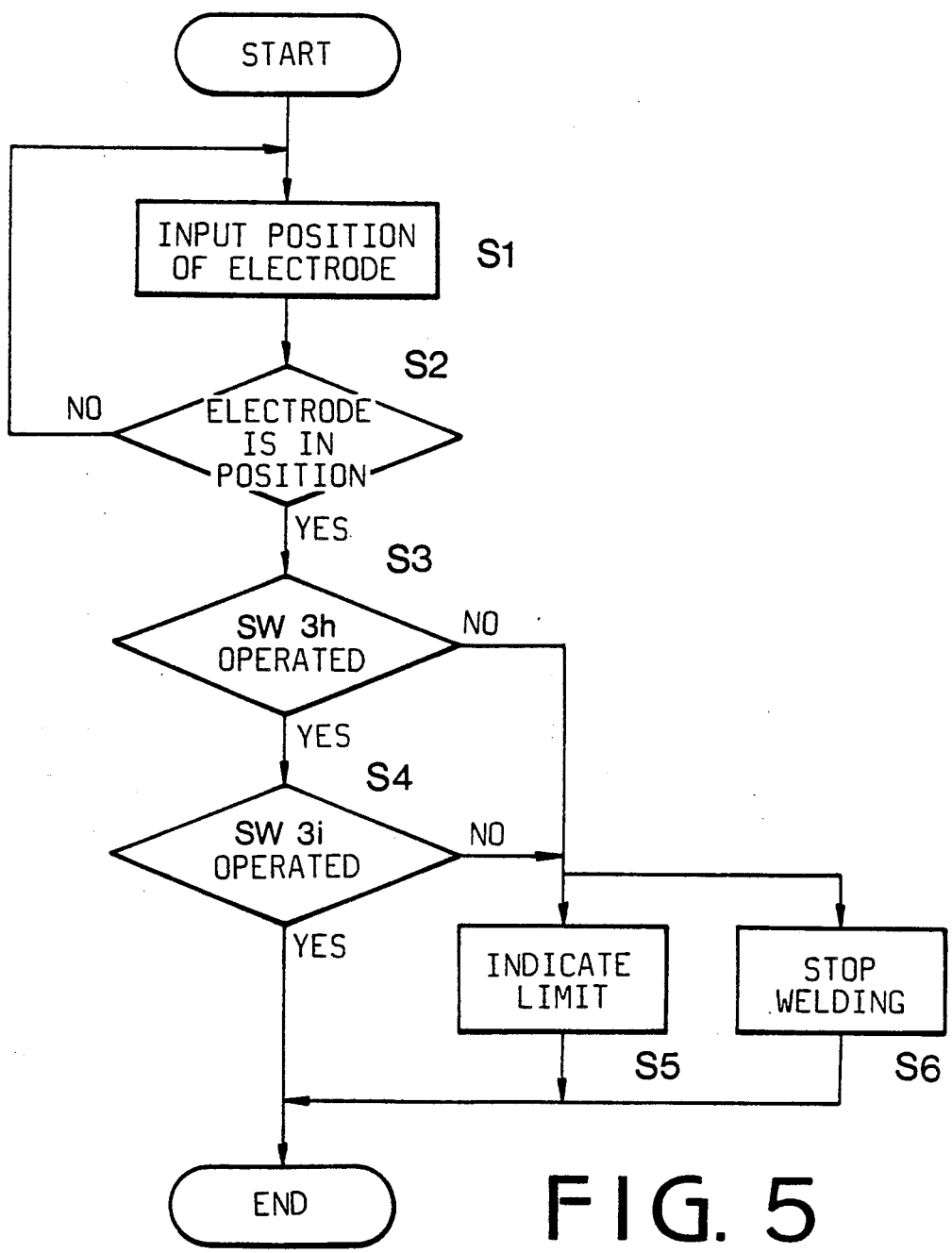
FIG. 5 is a flow chart showing an operation of the system.

The electrode tip 2d attached to the lower arm 2b is detected in accordance with the detecting rod 3g and the limit switch 3i in the same manner as the electrode tip 2c (step S4). FIG. 5 shows the above described operation.

In accordance with the present invention, if the working limit of the electrode tip is detected by the detecting means, the spot welding by the spot welder is automatically stopped at a proper timing for changing the electrode tip to the new one. Thus, defective welding and waste of electrode tips are eliminated. Since the system is simple in construction, manufacturing cost is reduced.

While the presently preferred embodiment of the present invention has been shown and described, it is to be understood that this disclosure is for the purpose of illustration and that various changes and modifications may be made without departing from the scope of the invention as set forth in appended claims.

What is claimed is:

1. A detecting system for a spot welder having a pair of electrode tips attached to a pair of arms respectively, comprising:
   a limit detecting device having a pair of axially slidable detecting rods spaced at a predetermined distance corresponding to the distance between the electrode tips, and a pair of switches each of which is operated by axial movement of the corresponding detecting rod;
   means for moving the electrode tips to the detecting rods so as to axially move the detecting rods to operate the switches respectively;
   means for determining whether each switch is operated or not;
   indicator means responsive to non-operation of the switch for indicating working limit of the electrode tip.

2. The system according to claim 1 wherein each of the detecting rods is urged by a spring to be projected from the working limit detecting device, and each of the electrode tips is moved against the spring.

* * * * *